Patent 3,510,335

3,510,335
TITANIUM PIGMENT PRODUCTION
William J. McGinnis, Waverly, Tenn., assignor to E. I. du Pont de Nemours and Company, Wilmington, Del., a corporation of Delaware
No Drawing. Filed Oct. 22, 1965, Ser. No. 502,599
The portion of the term of the patent subsequent to Nov. 12, 1985, has been disclaimed
Int. Cl. C09c 1/36
U.S. Cl. 106—300      8 Claims

ABSTRACT OF THE DISCLOSURE

A fade-resistant, opacifying co-oxidized $TiO_2$-$Al_2O_3$ pigment, with 0.1 to 10% $Al_2O_3$ content based on the $TiO_2$ content, having a porous $SiO_2$ coating, of 1 to 25% $SiO_2$, based on the $TiO_2$ obtained upon calcination at 300° C. to 1000° C. of the $SiO_2$ coated $TiO_2$-$Al_2O_3$ pigment material.

---

This invention relates to titanium dioxide pigments and more particularly to the production of improved discoloration resistant aluminum oxide-containing $TiO_2$ pigments resulting from the co-oxidation of titanium tetrachoride and aluminum chloride useful in the production of pigmented resinous materials, especially paper laminates.

$Al_2O_3$-containing $TiO_2$ white pigments are well known and adaptable for use in various pigmenting applications, including coating compositions, such as paints, enamels and lacquers, and as delusterants for artificial fibers such as rayon, nylon, etc. Useful procedures for their preparation are disclosed in U.S. Pat. 2,559,638, wherein $TiCl_4$ and controlled, small amounts of $AlCl_3$ are co-oxidized with air or oxygen at a relatively high temperature ranging from about 800 to 1350° C. The resulting product comprises a soft-textured pigment in uniform, small particle size, with an average particle size radius in the range of from 0.05 to 0.5 micron and preferably from .1 to .25 microns. $Al_2O_3$ present in the pigment as an essential ingredient ranges from about .1 to 10%, and preferably ranges from 0.5 to 3.5% by weight, based on the $TiO_2$.

In my copending U.S. application Ser. No. 387,790, filed Aug. 5, 1964, now U.S. Pat. 3,410,708, useful procedures are disclosed for enhancing the gloss, chalk resistance and weatherability characteristics of this pigment by subjecting the product emitted from the oxidation reactor of the flame process to wet treatment with sufficient porous silica ($SiO_2$) to completely coat the pigment particles and in amounts preferably ranging from about 2–5% by weight of the finished pigment. Thereafter, the treated pigment is recovered from the slurry by filtration, dried at about 150° C. and ground to desired fineness texture. It is then incorporated as a pigmenting ingredient in paints, enamels and lacquers.

It has now been found that if the $SiO_2$ treated $TiO_2$-$Al_2O_3$ product of my prior application is after-treated by calcination at a relatively high temperature rather than dried at a relatively low temperature, quite unexpectedly the resulting porous $SiO_2$ coated product is outstandingly useful for incorporation in resinous materials, especially paper laminates, as an opacifying pigment and provides a pigment-resin composition which when exposed to sunlight will not discolor or fade.

It is among the objects of this invention therefore to provide a novel form of $TiO_2$-$Al_2O_3$-$SiO_2$ pigment adapted for use in forming opacified resinous compositions which are photochemically stable to ultraviolet light, and particularly opacified melamine formaldehyde, urea formaldehyde, phenol formaldehyde type resins, especially paper laminates obtained by impregnating the resinous material with my improved opaque pigmenting substance. Such laminates comprise flat sheets used for counter tops, shelving and panelling, etc.

In accordance with this invention, the following process steps are undertaken:

(1) The $TiO_2$-$Al_2O_3$ product from the $TiCl_4$-$AlCl_3$ oxidation is directly quenched upon discharge from the reactor by mixing the product with water to form an aqueous slurry containing from 20–40% $TiO_2$-$Al_2O_2$ by weight.

(2) The resulting slurry is then heated to temperatures within a range of from 40 to 70° C.

(3) An alkali metal silicate, such as sodium silicate ($Na_2SiO_3$) is rapidly mixed with said surry and in quantities equivalent to from 1–25% $SiO_2$ based on the weight of the dry $TiO_2$ pigment being treated.

(4) The sodium silicate-treated slurry is then held at said 40–70° C. temperatures with accompanying agitation for a period of about 30 minutes in order to effect desired aging or conditioning of the slurry.

(5) Thereafter the pH of the heated and aged slurry is adjusted through sufficient acid addition to a pH in the range of from 6–6.5.

(6) The neutralized slurry thus obtained is then held for an additional period of about 30 minutes with agitation at said 40–70° C., after which is conventionally filtered and the treated pigment is dried and ground to break up undesired agglomerates.

As noted, these procedures entail a wet process for producing a porous silicate coating on $TiO_2$-$Al_2O_3$ pigments conveniently brought about by forming an aqueous pigment slurry containing 20–40% $TiO_2$-$Al_2O_3$ pigment, by weight, directly discharging into and quenching the pigment in water in a suitable corrosion resistant vessel such as a wooden, glass or plastic-lined tank, as it emits from the oxidation reactor or the cooling or calcining equipment. The use of more dilute or concentrated slurries is avoided because of their failure to produce the desired final form of $SiO_2$ coating.

Slurries made up from calciner discharge are usually neutral, whereas those perpared directly from reactor discharge are usually mildly acidic and in a pH range of from 2–6. A neutral form of slurry can be readily adjusted to the desired 2–6 pH range by adding thereto a sufficient concentration of mineral acid prior to alkali silicate and $SiO_2$ treatment. The choice of mineral acid utilized is relatively important in the process since the type and nature of the $SiO_2$ coating ultimately obtained will be found to depend upon the acid used. Thus, chalkfade resistance in exterior paint films will be found to increase in the sequence of the following acids used: $H_3PO_4 < H_2SO_4 < HCl < HNO_3$, with the latter two acids being about 3 times better than and hence preferred over use of the first two acids. For certain applications where gloss characteristics are more critical and important than chalking properties, recourse to sulfuric acid or hydrochloric acid is preferred This difference in the physical nature of the $SiO_2$ coating obtained with the use of solutions acidified with the various, different mineral acids mentioned is not presently clearly understood.

Following acidification, should this be necessary to provide a desired 2–6 pH range, heating of the slurry to a temperature in the range of from 40° C. to 70° C. and preferably to about 60° C. ±5° C. is undertaken. Since temperatures in excess of 70° C. tend to form undesired denser silica coatings on the pigment particles, such excessive temperatures are avoided, as are temperatures below 40° C. which induce an undesired slow reaction rate.

The hot 40–70° C. slurry is then mixed with a solution of an alkali metal silicate, preferably sodium silicate ($Na_2SiO_3$), containing in the range of from 100–400 gms./liter of $SiO_2$. Such mixing is quickly effected and with accompanying mild agitation of the slurry by means of conventional stirring equipment. Addition of the silicate solution is continued until the amount of $SiO_2$ present in the mixture is equivalent to from 1–25% of the weight of the $TiO_2$-$Al_2O_3$ pigment, and preferably ranges in amount to from 2–5% $SiO_2$ by weight. On completion of silicate addition, the pH of the silicate-$TiO_2$ slurry should be at least 9 and may range up to pH 11, depending upon the amount of sodium silicate utilized. Agitation is continued for about 30 minutes after silicate introduction, and the slurry is then neutralized to a 6–6.5 pH by incorporating therein a sufficient quantity of a suitable mineral acid to result in precipitation and coalescense of $SiO_2$ as a coating completely covering the pigment. The choice of acid employed will, as above noted, bear directly not only on the quality of the coating formed but on the ultimate pigment characteristics of the product obtained.

Upon desired slurry aging and $SiO_2$ precipitation, a further conditioning treatment is undertaken. This is preferably carried out at a pH of 6–6.5 and for an additional 30–60 minutes while maintaining the slurry at 40–70° C. If desired, shorter aging periods, say from about 20–30 minutes or a longer time, and up to about several hours can be resorted to. Thereafter, the porous $SiO_2$ coated $TiO_2$ pigment is recovered from the slurry by filtration. It is then calcined at temperatures above 300 and to 1000° C., and preferably between about 400–600° C. At least 15 minutes of calcination is undertaken at high temperatures of 550° C. with up to 30 minutes of calcination being resorted to with lower, above 300 to 400° C. temperatures. Following calcination, the pigment is ground or otherwise conventionally finished to obtain the final pigment. Preferably, such grinding treatment is carried out in a micronizer or like fluid energy mill, using a steam propellant.

To a clearer understanding of the invention the following more specific example is given wherein the parts mentioned are by weight. This example is merely illustrative of and is not to be construed as limiting the underlying principles and scope of the invention.

EXAMPLE I

Four 6000-gram portions of a co-oxidized $TiO_2$-$Al_2O_3$ pigment containing 1.6% $Al_2O_3$, were prepared by following the procedures disclosed in U.S. 2,559,638. Each of the portions thus prepared was separately stirred into 12 liters of cold de-ionized water to form a 33% pigment-water slurry having an initial acidic pH in the range of 2–5. The slurry mixtures were then heated to 60° C. and stirred with a standard propeller mixer for 30 minutes while being maintained at the temperature mentioned. A solution containing 200 grams of $SiO_2$/liter as sodium silicate was then added to the four pigment slurries thus separately prepared to obtain four pigment mixtures containing 2%, 5%, 10% and 15% by weight of $SiO_2$. The pH of these slurries ranged from 8–11. Each pigment mixture was then held at 60° C. for a period of 60 minutes with accompanying mild agitation. and the pH of each slurry was then lowered to 5.5–6.5 through the addition of sufficient sulfuric acid. The acidified slurries were then filtered and the pigment products were recovered, then washed and were then variously calcined for 30 minutes as shown in Table I below. The calcined pigments were then ground separately in a fluid energy mill to provide the desired fine-textured products and were separately incorporated in a standard melamine formaldehyde plastic laminate and tested for non-discoloration in a standard test applied to pigment candidates intended for use in laminated papers prepared under pressure using conventional type resins, with the following results:

TABLE I

| Pigment Sample | Percent $SiO_2$ | Calcination temp., °C. | Discoloration in paper laminates* |
|---|---|---|---|
| A | 2 | None | 4 |
| B | 2 | 550 | 8 |
| C | 2 | 450 | 7 |
| D | 5 | None | 5 |
| E | 5 | 550 | 9 |
| F | 5 | 450 | 8 |
| G | 10 | None | 4 |
| H | 10 | 450 | 9 |
| I | 15 | None | 4 |
| J | 15 | 450 | 9 |
| K | 15 | 450 | 9 |
| L | 7.5 | None | 4 |
| M | 7.5 | 400 | 7 |
| N | 7.5 | 550 | 8 |
| O | 7.5 | 600 | 8 |
| P | 7.5 | 700 | 8– |
| Q | 7.5 | 800 | 8– |
| R | 7.5 | 900 | 7½ |

*These results were obtained by a standard Discoloration in Melamine Formaldehyde Plastic Laminate. A sample is prepared by coating a piece of white blotter paper with a melamine-formaldehyde resin solution containing 50% $TiO_2$ then drawing this resin down with a doctor blade to form a film 0.010" thick. The coated paper is placed between two melamine formaldehyde films and heated at 265° F. under 1000 p.s.i.g. pressure until bonded. The laminate is placed in a Fade-Ometer for 24 hours to simulate weather conditions. Upon visual comparison with the unweathered sample, which is given a value of 10 for no yellowing on a scale where 0 is the worst yellowing, the above values were determined.

Although described as applied to particular embodiments, the invention is not, as already noted, limited thereto. Water-soluble alkali metal sodium and potassium silicates are particularly useful, with sodium silicate, containing a $SiO_2$:$Na_2O$ ratio of about 3.8:1 by weight, being especially preferred. In general, however, use is contemplated of the various water-soluble silicates, especially alkali metal silicates, which form soluble acid salts which can be washed out of the pigment, as well as mixtures of these silicates. After silicate solution addition to the acidic, mechanically agitated slurry suspension, the pH of the suspension is moderately basic and ranges from pH 9–11. The pigment can be aged in the tank in this basic solution for an hour or so prior to neutralization by mineral or organic (acetic acid) addition. After the pH has been readjusted to 6–6.5, it is further aged for at least 30 minutes prior to filtration and drying. If desired, acidification of the $TiO_2$ suspension to a pH of 1–1.5 or lower can be resorted to prior to the addition of the silicate solution. Again, in the pigment drying operation the temperatures employed are maintained below 200° C. and preferably are within the range of from about 120–140° C.

The temperature and conditions of treatment under which $SiO_2$ coating is effected will be found to affect the porosity of the silica coating applied to the pigment. At relatively higher temperatures (70° C–100° C.) a more dense type of coating forms on the pigment, while with the use of lower temperatures (40° C.–70° C.), the preferred porous form of coating will result. A porous coating permits penetration by acid into the substrate or $TiO_2$-$Al_2O_3$, base, and a coated pigment is characterized by the ease with which $TiO_2$ is leached therefrom. $TiO_2$-$Al_2O_3$ co-oxidized pigments with a 2–25% silica treatment contain from 0.1% to 0.3% soluble $TiO_2$ and from 0.4% to 0.65% soluble $Al_2O_3$ when treated with 15% sulfuric acid and from 0.3% to 0.8% soluble $TiO_2$ and 0.25%–0.75% soluble $Al_2O_3$ with 50% $H_2SO_4$.

Coating a rutile $TiO_2$-$Al_2O_3$ pigment with silica as the sole treating agent and calcining in accordance with the invention will be found to provide a superior pigment product over a straight $TiO_2$ substrate treated through precipitation with an alumina-silicate coating and obviates the necessity of applying a plurality of treating agents such as $TiO_2$ and $Al_2O_3$ in addition to $SiO_2$. Advantageously, it will be found to suitably combine with all commonly used paper laminating plastics to produce pigmented resinous materials and particularly an opacified white laminated paper which desirably resists discoloration and yellowing when exposed to the atmosphere and to ultraviolet light.

I claim as my invention:

1. As a new pigment composition, calcined coated $TiO_2$ pigment containing as an ingredient from 0.1 to 10% by weight $Al_2O_3$ based on the $TiO_2$ content of the said pigment and formed by the co-oxidation of $TiCl_4$-$AlCl_3$, having a porous coating consisting essentially of from 1–25% by weight of $SiO_2$, based on the $TiO_2$ content of said pigment.

2. The product of claim 1 in which the porous $SiO_2$ coating is present in from 2–5% by weight.

3. The product of claim 1 containing from .1–10% $Al_2O_3$ and from 1–25% of porous $SiO_2$.

4. The product of claim 1 containing from .5 to 3.5% $Al_2O_3$ and from 2–5% of porous $SiO_2$.

5. A process for producing a porous coated pigment of $TiO_2$ containing from 0.1 to 10% by weight $Al_2O_3$ based on the $TiO_2$ content of the said pigment and formed by the co-oxidation of $TiCl_4$-$AlCl_3$, comprising forming a hot 40–70° C. acidic, aqueous slurry suspension containing 20–40% by weight of said pigment, incorporating with accompanying agitation a water-soluble silicate solution therein until the amount of $SiO_2$ present ranges from 1–25%, based on the $TiO_2$ present, aging the resulting mixture at a pH of at least 9 and thereafter adjusting said pH to not to exceed 6.5, thence aging of the acidified slurry for from 20 to 60 minutes, recovering the resulting pigment coated with porous $SiO_2$, calcining the product at a temperature above 300° C. and to as high as 1000° C., and recovering the resulting calcined $SiO_2$ coated pigment product.

6. The process of claim 5 in which incorporation of the alkali metal silicate solution is continued until the amount of $SiO_2$ present ranges from 2–5%, adjustment of the pH to a range of 6–6.5 is undertaken and the recovered porous $SiO_2$ coated product is calcined at from 400–600° C.

7. The process of claim 6 in which the alkali metal silicate is sodium silicate.

8. The process of claim 7 in which the amount of sodium silicate solution used contains from 100–300 grams/liter $SiO_2$, the aging treatment is carried out under a pH of from 9 to 11 for a period of about 30 minutes, adjustment of the pH of the mixture to from 6–6.5 is brought about by mineral acid addition, and the neutralized slurry is further aged for a period of about 30 minutes.

References Cited

UNITED STATES PATENTS

| | | | |
|---|---|---|---|
| 2,296,636 | 9/1942 | Hanahan | 106—300 |
| 2,671,031 | 3/1954 | Whatiely | 106—300 |
| 2,780,558 | 2/1957 | Wilcox | 106—300 |
| 2,885,366 | 5/1959 | Iler | 106—300 |
| 3,035,966 | 5/1962 | Siuta | 106—300 |
| 3,146,119 | 8/1964 | Ritter | 106—300 |
| 3,251,705 | 5/1966 | Rieck et al. | 106—300 |
| 3,316,204 | 4/1967 | Lederer | 106—300 |

TOBIAS E. LEVOW, Primary Examiner

H. M. S. SNEED, Assistant Examiner

U.S. Cl. X.R.

106—308; 162—181; 260—38, 39